United States Patent [19]
Siegler, Jr.

[11] 3,917,406
[45] Nov. 4, 1975

[54] OPTICAL BEAM SPLITTER
[75] Inventor: E. Horace Siegler, Jr., Darien, Conn.
[73] Assignee: The Perkin-Elmer Corporation, Norwalk, Conn.
[22] Filed: Sept. 16, 1974
[21] Appl. No.: 506,266

[52] U.S. Cl. .................. 356/88; 356/87; 350/172
[51] Int. Cl.² .................. G01J 3/42; G02B 27/14
[58] Field of Search ............ 356/88, 89, 93, 95, 97, 356/98, 113, 85, 87; 350/172, 169; 250/575

[56] References Cited
UNITED STATES PATENTS
| | | | |
|---|---|---|---|
| 1,662,693 | 3/1928 | Astafiev | 350/172 |
| 3,449,050 | 6/1969 | Keahl | 356/95 |
| 3,725,204 | 4/1973 | Marshall et al. | 356/95 |

Primary Examiner—Vincent P. McGraw
Assistant Examiner—Jon W. Henry
Attorney, Agent, or Firm—John K. Conant

[57] ABSTRACT

A pair of beam splitters for an optical instrument wherein one beam splitter is used to divide source radiation into a sample and reference beam while the second beam splitter recombines the sample and reference beams prior to their entering a monochromator. In order to reduce schlieren effects, each beam splitter is provided with stripes of alternating reflective and transmitting portions. The edges of the stripes of each beam splitter lie wholly within the optical aperture while the ends of the stripes extend outwardly of the optical aperture. The beam splitters are oriented in such a manner that the stripes are orthogonal.

8 Claims, 4 Drawing Figures

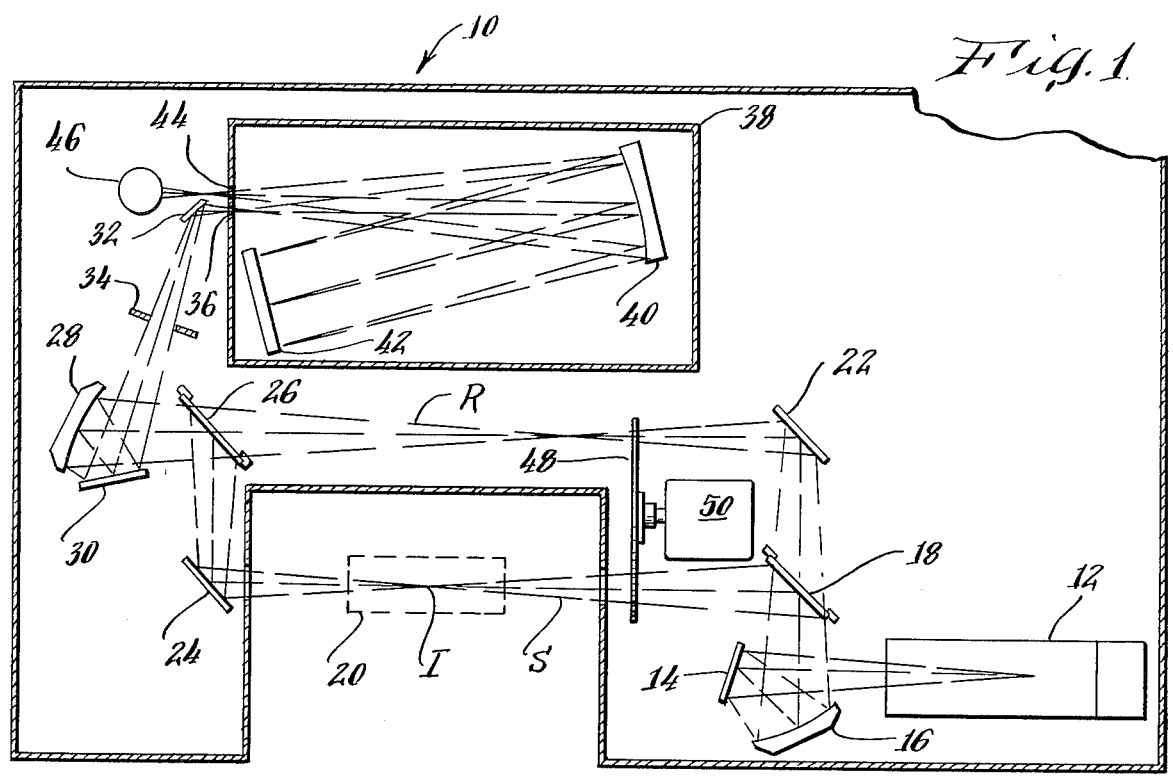
*Fig. 1.*
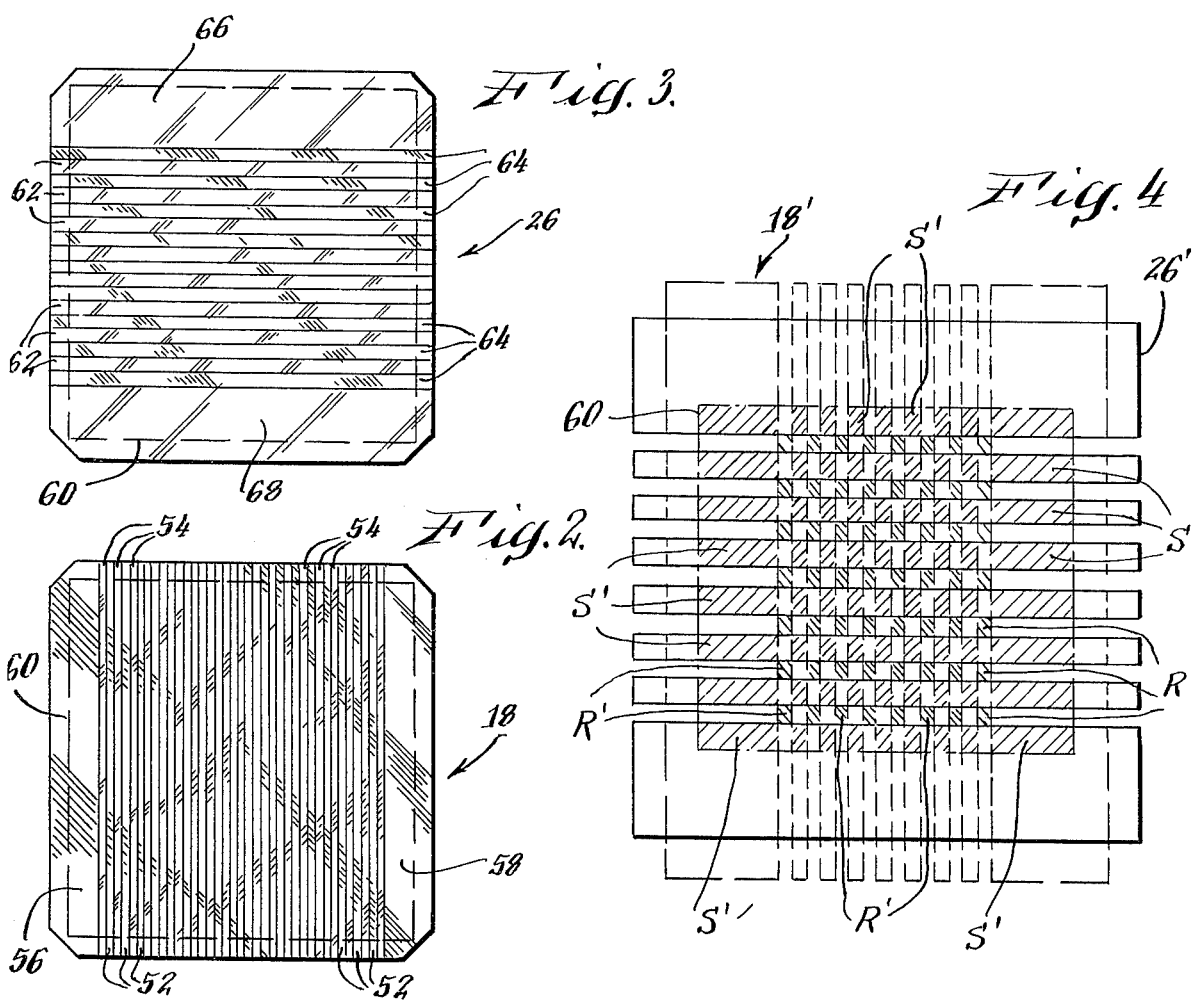
*Fig. 3.*
*Fig. 4.*
*Fig. 2.*

OPTICAL BEAM SPLITTER

BACKGROUND OF THE INVENTION

This invention pertains to optical beam splitters and, more particularly, to such beam splitters employed in optical instruments such as atomic absorption spectrometers. In one type of atomic absorption spectrometer, two beam splitters are employed. One receives radiation from the source lamp and divides it into a sample and a reference beam. The sample beam is focused to a slit image in the sample atomizing region (e.g. a flame) and thereafter the second beam splitter recombines the sample and reference beams which are thereafter passed through a monochromator to a detector.

The beam splitters first proposed to be employed in the aforementioned instrument were of the conventional "brick" type. However, when these beam splitters were employed, it was discovered that undesirably high noise was present. Experimentation disclosed this noise to be a result of time-dependent variation in the optical homogeneity of the flame or sample. The slit image formed in the sample space is approximately half a millimeter wide and 3–7 millimeters high. The brick pattern of the first beam splitter was roughly imaged on the second by pinhole optics through the medium of the slit image. It appeared that schlieren effects caused the image of the first beam splitter to shift or waiver on the second beam splitter, thereby introducing noise.

Accordingly, it is a primary object of the present invention to provide dual beam splitters for an optical measuring instrument which will substantially minimize noise generated by schlieren effects. However, it is also important, in addition, to retain certain other features crucial to a well designed instrument. Accordingly, other objects of this invention are: to provide beam splitters which have a ratio of reflectance to transmittance which is essentially constant over the ultraviolet and visible regions; to provide beam splitters which permit adjustment of the reflectance to transmittance ratio to a desired value; to provide beam splitters which match each other in optical characteristics such as relative intensity, wavelength, and spectral slit width; and to provide beam splitters which provide high efficiency, such as through low absorption losses. Other objects, features, and advantages of this invention will be apparent from the following description and appended claims.

SUMMARY OF THE INVENTION

An improvement in an optical system which includes an aperture stop and first and second beam splitters in the same optical path. Each of the beam splitters has alternating reflective and transmitting stripes. The stripes of the first beam splitter are substantially orthogonal to those of the second beam splitter.

BRIEF DESCRIPTION OF THE DRAWING

FIG. 1 illustrates an atomic absorption spectrometer embodying the beam splitters of this invention;

FIG. 2 is an elevational view of one of the beam splitters of this invention;

FIG. 3 is an elevational view of the other of said beam splitters of this invention; and FIG. 4 illustrates the imaging of one beam splitter on the other as an aid to understanding the operation of the invention.

DESCRIPTION OF THE PREFERRED EMBODIMENT

There is illustrated in FIG. 1 an atomic absorption spectrometer 10 having a radiation source 12, such as a hollow cathode lamp. Source 12 directs a beam of monochromatic radiation to a flat mirror 14 where it is redirected to a toroidal focusing mirror 16. Mirror 16 directs the radiation to a fixed beam splitter 18 which redirects a portion of the radiation into a sample beam S, a slit image I of the source being formed within the sample region 20. The transmitted portion of the radiation continues through the beam splitter 18 to a flat mirror 22 which forms a reference beam R parallel to but displaced from the sample beam. After passing through the sample region, the sample beam is reflected by a flat mirror 24 onto a second fixed beam splitter 26, which is also positioned in reference beam R. The sample and reference beams are thereby recombined and a toroidal mirror 28 redirects the radiation through a pupil stop 34 and flat mirrors 30, 32 direct the beam to an image at the entrance slit 36 of a monochromator 38. Monochromator 38 operates in the usual manner by means of a collimating mirror 40 and grating 42 to isolate a narrow band of wavelengths and form an image therewith at exit slit 44, the radiation from the exit slit falling on a detector 46. An opaque chopper 48 operated by motor 50 is positioned to repetitively block the sample and reference beams in the desired sequence.

Two of the five objectives of this invention, namely, insensitivity to time variant changes in the optical homogeneity of the sample environment and the matching of the optical characteristics of the beams could be achieved by semi-transparent beam splitters. Such beam splitters may be formed, for example, by evaporation of a uniform thin reflective layer on a fused silica substrate. However, such beam splitters would either not achieve the remaining objectives or would be difficult to control in practice. The brick pattern beam splitters previously employed could achieve the secondary objectives set forth, but, as previously pointed out, would be sensitive to schlieren effects originating in the sample environment. The beam splitters of this invention which, in combination, attain all of the objectives set forth above will now be described with particular reference to FIGS. 2 and 3.

FIG. 2 illustrates the beam splitter 18. It comprises a fused silica substrate upon which is deposited an aluminized reflective surface in the form of a plurality of vertical reflective stripes 52 separated by transparent areas 54. The beam splitter 18 also includes left 56 and right 58 reflective portions which are wider than the reflective stripes 52. The ratio of reflecting to transmitting areas of the beam splitter 18 may be varied to suit the conditions of use. For example, in the illustrated beam splitter the reflective and transparent stripes are approximately equal, having widths of slightly over 1 millimeter.

FIG. 3 illustrates the second beam splitter 26 which is similar, in most respects, to the beam splitter 18. However, in this embodiment, the stripes run horizontally in the form of reflective stripes 62 separated by transparent areas 64. The beam splitter 26 also includes top 66 and bottom 68 reflective portions which are wider than the reflecting stripes 62. The ratio of reflection to transmission of the second beam splitter may also be varied to suit conditions, but in one embodiment designed for use with the beam splitter 18 previously described, the reflective stripes are slightly wider than the transparent stripes in order to accept a greater proportion of radiation from the sample beam S. In one actual embodiment the width of each reflecting stripe 62 is approximately 2.36 millimeters while the width of each transmitting (transparent) stripe 64 is approximately 1.15 millimeters.

The dash lines 60 are not physical parts of beam splitters 18 and 26 but merely define the optical clear aperture of the system; they are included to illustrate an important feature, namely, that the stripes extend vertically and horizontally well beyond the aperture, but are displaced horizontally and vertically well within the aperture, on the respective beam splitters.

As was previously explained, the slit image I has a width of only approximately 0.5 millimeter and, accordingly, functions as a pinhole, roughly focusing an image of beam splitter 18 onto the beam splitter 26. The result is illustrated in FIG. 4 which illustrates somewhat schematically beam splitter 26' having superimposed thereon the image 18' of beam splitter 18. The outlines of the two beam splitters are distorted so as not to obscure one another and the stripes are shown fewer and much larger than in actuality in order to illustrate the function of the invention. The aperture 60 is shown by dash-dotted lines.

The sample beam is reflected from the reflective portions of beam splitter 18 and, where these reflected portions of the sample beam impinge upon the reflective portions of beam splitter 26 they are once again reflected and are shown as cross hatched areas S'. That light which passes through the transmitting areas of beam splitter 18 forms the reference beam and those portions which thereafter also pass through the transmitting portions of beam splitter 26 enter the recombined beam and are illustrated by opposite cross hatching and designated R'.

Assume now that schlieren effects in the sample region 20 of the spectrometer cause the image 18' of the first beam splitter to move on the surface of beam splitter 26', it will be apparent by observation that there will be essentially no change in the ratio of sample beam radiation S' to reference beam radiation R'. In other words, since the stripes are orthogonal, the combination of horizontal and vertical stripes is insensitive to beam bending. Furthermore, edge effects are eliminated by keeping the stripes within the clear aperture 60 and having the beam in the sample space slightly overfill the optical beam of the system.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In an optical measuring instrument including a source of radiation, means for forming a first beam of said radiation, a first beam splitter positioned in said first beam to form a sample beam and a reference beam, a second beam splitter, means for directing said sample and reference beams onto said second beam splitter to form a recombined beam, and means for analyzing said recombined beam, the improvement which comprises: each of said beam splitters having alternating reflecting and transmitting stripes, the projections of the stripes of said first beam splitter onto a plane normal to the optical axis being substantially orthogonal about the optical axis to the corresponding projections of the stripes of said second beam splitter.

2. The improvement of claim 1 wherein said sample beam defines a focal point in the optical path between said first and second beam splitters.

3. The improvement of claim 1 wherein the ends of the stripes of at least one of said beam splitters extend beyond the edges of the optical aperture of the instrument.

4. The improvement of claim 1 wherein the ends of the stripes of both beam splitters extend beyond the edges of the optical aperture of the instrument.

5. The improvement of claim 1 wherein the edges of the stripes of at least one of said beam splitters lie within the optical aperture of the instrument.

6. The improvement of claim 1 wherein the edges of the stripes of both beam splitters lie within the optical aperture of the instrument.

7. The improvement of claim 6 wherein the ends of the stripes of each beam splitter extend beyond the optical aperture of the instrument.

8. The improvement of claim 7 wherein said sample beam forms an image in the optical path between said first and second beam splitters.

* * * * *